United States Patent
Kelpe et al.

(10) Patent No.: US 9,121,499 B2
(45) Date of Patent: Sep. 1, 2015

(54) TRANSMISSION ACTUATOR

(75) Inventors: Holger Kelpe, Hannover (DE); Stefan Klik, Hannover (DE); Jens Willms, Seelze (DE)

(73) Assignee: WABCO GmbH, Hannover (DE)

( * ) Notice: Subject to any disclaimer, the term of this patent is extended or adjusted under 35 U.S.C. 154(b) by 280 days.

(21) Appl. No.: 13/519,028

(22) PCT Filed: Nov. 30, 2010

(86) PCT No.: PCT/EP2010/007232
§ 371 (c)(1),
(2), (4) Date: Jun. 25, 2012

(87) PCT Pub. No.: WO2011/103895
PCT Pub. Date: Sep. 1, 2011

(65) Prior Publication Data
US 2012/0272770 A1 Nov. 1, 2012

(30) Foreign Application Priority Data

Feb. 25, 2010 (DE) .......................... 10 2010 009 338

(51) Int. Cl.
*F16H 59/02* (2006.01)
*F16H 61/30* (2006.01)
*F16H 63/38* (2006.01)
*F16H 59/70* (2006.01)
*F16H 61/00* (2006.01)
*F16H 63/30* (2006.01)

(52) U.S. Cl.
CPC ................ *F16H 61/30* (2013.01); *F16H 63/38* (2013.01); *F16H 59/70* (2013.01); *F16H 2061/0087* (2013.01); *F16H 2061/307* (2013.01); *F16H 2063/3083* (2013.01); *Y10T 74/20024* (2015.01); *Y10T 74/20177* (2015.01)

(58) Field of Classification Search
CPC . F16H 59/70; F16H 2063/3083; F16H 61/30; F16H 2061/0087
USPC .......................................... 74/473.11, 473.36
See application file for complete search history.

(56) References Cited

U.S. PATENT DOCUMENTS

| | | | |
|---|---|---|---|
| 3,418,807 A | | 12/1968 | Frost |
| 4,458,550 A | * | 7/1984 | Takahashi .................. 74/473.36 |
| 4,539,447 A | * | 9/1985 | Mizutani et al. ........... 200/61.91 |
| 5,950,492 A | * | 9/1999 | Crawford ..................... 74/473.3 |
| 6,082,215 A | * | 7/2000 | Jerwick ...................... 74/473.25 |
| 6,189,402 B1 | * | 2/2001 | Ikeda .......................... 74/473.36 |
| 7,597,024 B2 | * | 10/2009 | Matsuda .................... 74/473.36 |
| 7,650,810 B2 | * | 1/2010 | Levin et al. ............... 74/471 XY |

(Continued)

FOREIGN PATENT DOCUMENTS

| | | |
|---|---|---|
| DE | 25 10 392 | 9/1976 |
| DE | 199 57 750 A1 | 6/2001 |

(Continued)

*Primary Examiner* — David M Fenstermacher
(74) *Attorney, Agent, or Firm* — Kramer Levin Naftalis & Frankel LLP

(57) ABSTRACT

For actuating a manual transmission in an automated manner, an actuator comprises a gate selection actuating cylinder for selecting a shift gate, a gear selection actuating cylinder for engaging a gear in the shift gate, and a catch device configured to releasably fix one of the gate selection actuating cylinder and a component moveable by the gate selection actuating cylinder in at least one predetermined catch position.

9 Claims, 3 Drawing Sheets

(56) References Cited

U.S. PATENT DOCUMENTS

| | | | |
|---|---|---|---|
| 7,770,486 B2* | 8/2010 | Morita et al. | 74/473.18 |
| 8,087,319 B2* | 1/2012 | Ore | 74/473.25 |
| 8,210,066 B2* | 7/2012 | Bai et al. | 74/473.12 |
| 8,246,518 B2* | 8/2012 | Trevino et al. | 477/125 |
| 8,627,739 B2* | 1/2014 | Tooman et al. | 74/473.36 |
| 2003/0079562 A1* | 5/2003 | Schaible et al. | 74/473.37 |
| 2004/0177714 A1* | 9/2004 | Ronge | 74/473.37 |
| 2011/0041639 A1 | 2/2011 | Brammer et al. | |
| 2011/0061487 A1* | 3/2011 | Tooman et al. | 74/473.36 |
| 2011/0155497 A1* | 6/2011 | Kobayashi et al. | 180/365 |

FOREIGN PATENT DOCUMENTS

| | | |
|---|---|---|
| DE | 10 2005 002 995 A1 | 12/2006 |
| DE | 10 2006 035 938 B4 | 2/2008 |
| DE | 10 2008 014 504 A1 | 9/2009 |
| EP | 1 120 589 A2 | 8/2001 |
| FR | 2 814 524 | 3/2002 |

* cited by examiner

TRANSMISSION ACTUATOR

FIELD OF THE INVENTION

The present invention generally relates to a gearbox actuator for automatic operation of a manual gearbox.

BACKGROUND OF THE INVENTION

Gearbox actuators of the general type under consideration are used to automate gearboxes in manual transmissions. In such manual transmissions, it is proposed that a gear selector element, which would be operated with a gear stick on manual operation, is guided along a selection gate to a desired shift gate and then moved into a gear position in order to engage a gear. Usually several shift gates are provided along the selection gate, transverse to the selection gate. These shift gates end in positions in which a gear is engaged. FIG. 1 is a high level schematic showing, as an example, a gearbox with six forward gears and one reverse gear. Three shift gates 9, 10, 11 are provided along a selection gate 7 for forward gears and a further shift gate 8 for reverse gear.

A gearbox actuator for gearbox automation usually has an actuating cylinder via which the gear selector element is guided along the selection gate and can be positioned at an intersection point of a desired shift gate. Such an actuating cylinder is called a gate selection actuating cylinder. To engage a gear in the selected shift gate, a gear selection actuating cylinder is provided that guides the gear selection element accordingly into the selected shift gate and positions it so that the desired gear is engaged.

For precise positioning of the gear selection element in the selection gate, conventional gearbox actuators use a gate selection actuating cylinder with a number of defined shift positions corresponding to the number of shift gates, which positions can be set by activation of a pressure medium. To approach three positions, for example, a three-position cylinder is used. Such a three-position cylinder is in itself already relatively complex. For precise positioning with a higher number of shift positions, the design complexity for a corresponding multiposition cylinder would be even greater.

SUMMARY OF THE INVENTION

Generally speaking, it is an object of the present invention to provide a gear actuator for automated operation of a manual gearbox in which a multiplicity of defined positions can be approached with low constructional complexity.

According to an embodiment of the present invention, a gate selection actuating cylinder, or a component that can be moved by the gate selection actuating cylinder, can be fixed automatically via a catch device in at least one predetermined catch position. Such a catch device can be provided with relatively little constructional complexity and favorable production costs. A catch device can also be implemented in existing gear actuator constructions at reasonable cost. Embodiments of the invention make it advantageously possible to use a relatively simple actuating cylinder as a gate selection actuating cylinder, such as, e.g., a double-action actuating cylinder with only two defined positions, namely a front and a rear end position. On activation of such an actuating cylinder with pressure medium, in particular compressed air, it would not be possible simply to approach defined intermediate positions between the end positions. The use of the catch device, however, allows fixing in one or more additionally desired intermediate positions corresponding to the catch positions between the end positions to be possible at low cost.

In relation to other constructional solutions such as, e.g., the provision of an additional piston in a multi-position actuating cylinder, the solution provided by embodiments of the present invention can be achieved economically, and because little construction space is required, the various embodiments can be easily integrated in existing devices. In comparison with spring centering, the necessary shift force of the actuating cylinder is advantageously not or only insignificantly increased.

The device also provides the possibility of forming one or both end positions of the actuating cylinder as catch positions. According to an advantageous embodiment of the invention, the catch position is different from the end positions of the gate selection actuating cylinder. As a result, an additional shift position that can be approached in a defined manner for gate selection can easily be created.

According to an embodiment of the invention, the fixing achieved by the catch device can be overcome by activation of the gate selection actuating cylinder. This has the advantage that no additional components are required for unlocking the catch device, such as a piston activated by compressed air. Fixing can be overcome by activation of the pressure medium of the gate selection actuating cylinder if this is activated with sufficiently high pressure.

According to a further embodiment of the invention, the gate selection actuating cylinder is designed to move a shift finger into a selection gate. The shift finger serves advantageously as a gear selection element with which the corresponding gear parts can be activated to engage a gear.

According to another embodiment of the invention, the gate selection actuating cylinder is formed as a multi-position cylinder, which has end positions as well as at least one predetermined intermediate position that can be approached by activation of the pressure medium. The gate selection actuating cylinder can, in particular, be formed as a three-position cylinder. The catch position here differs from the end positions and the intermediate position. As a result, a further shift position, which can be approached in a defined manner, is created at low cost and without the need to further complicate the design of the gate selection actuating cylinder. Thus, with a three-position cylinder and an additional catch position, a gearbox with four shift gates can be operated automatically by the gearbox actuator.

It is contemplated that further catch positions can be provided. As a result, the number of shift positions that can be approached in a defined manner can be increased further with little cost.

According to another embodiment of the invention, the catch device has a locking element, which in the catch position, engages in an allocated locking recess. The locking element is under spring force in the direction of the locking recess. This allows a constructionally simple and low cost production of an automatically acting catch device.

According to a still further embodiment the invention, the locking recess has sloping side walls. With corresponding dimensioning of the spring force of the catch device, this advantageously allows the angle of the side walls and the profile of the locking element engaging in the locking recess to be matched to the catch device such that, firstly, secure fixing in the catch position is achieved, and, secondly, by activating the pressure medium, the fixing achieved by the catch device can be overcome by activating the pressure medium of the gate selection actuating cylinder.

According to a further embodiment of the invention, the locking element is integrated in the shift finger. This allows a favourable design and space-saving arrangement of the locking element.

According to another embodiment of the invention, the gear actuator has a distance sensor for detecting the activation stroke of the gate selection actuating cylinder. By means of the distance sensor, the activation of the gate selection actuating cylinder and the reaching of the desired shift positions can be advantageously monitored.

According to a further embodiment of the invention, the distance sensor is connected to an electronic control device. The electronic control device is designed to evaluate the distance signal of the distance sensor and output an actuating signal to the gate selection actuating cylinder. The electronic control device is furthermore designed for automatic learning of the catch position and the actuating time necessary for actuation of the gate selection activating cylinder from an end position or from the intermediate position into the catch position. This allows an advantageous self-learning function of the electronic controller of the gearbox actuator. The learning function can be provided, for example, in the form of a function in the software of the electronic control device. Via the learning function, e.g., under modified friction conditions in operation of the gearbox actuator, automatic adjustment of the necessary actuation time of the gate selection actuating cylinder required to approach a particular position can be learned and then applied. This allows, as a whole, low-maintenance operation of the gearbox actuator.

Still other objects and advantages of the present invention will in part be obvious and will in part be apparent from the specification.

The present invention accordingly comprises the features of construction, combination of elements, and arrangement of parts, all as exemplified in the constructions herein set forth, and the scope of the invention will be indicated in the claims.

BRIEF DESCRIPTION OF THE DRAWINGS

Exemplary embodiments of the invention will be described in greater detail below with reference to the appended drawings, in which.

In the figures, the same reference numerals are used for corresponding elements.

DETAILED DESCRIPTION OF THE PREFERRED EMBODIMENTS

Figure 1:
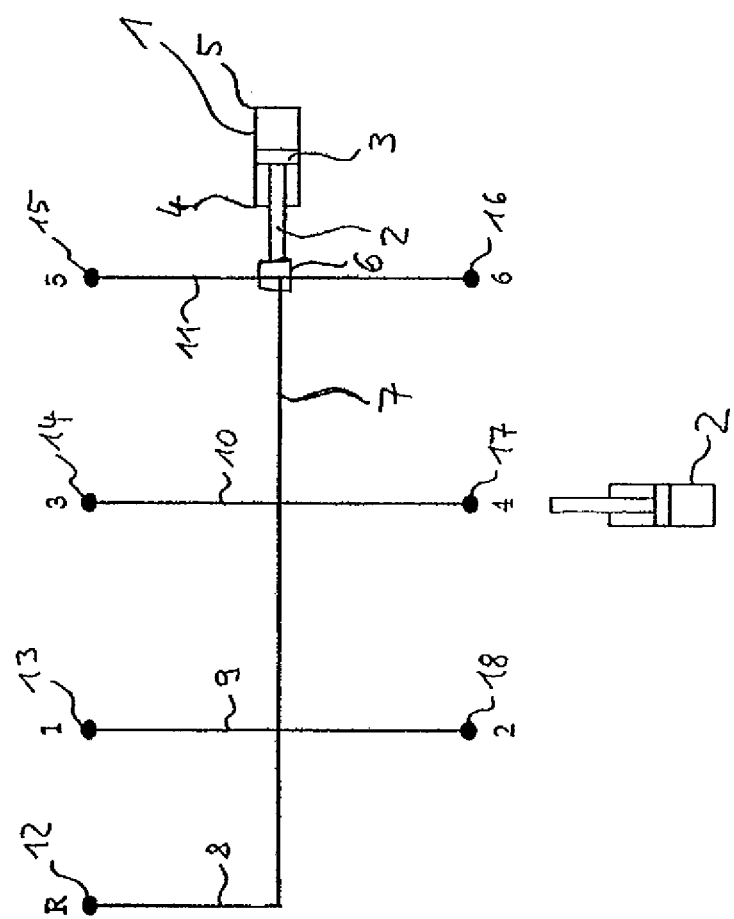
FIG. 1 is a schematic view of a gearbox actuator with a manual gearbox in accordance with an embodiment of the present invention.

FIG. 1 is a high level schematic illustration of a manual gearbox with four shift gates 8, 9, 10, 11 and one selection gate 7. A gear selection element 6 can be moved along the selection gate 7 and, on reaching a shift gate 8, 9, 10, 11, can be moved in the orthogonal direction into one of the positions 12, 13, 14, 15, 16, 17, 18. In these positions, a desired gear of the manual gearbox shown can be engaged. To activate the gear selection element 6 along the selection gate, a gate selection actuating cylinder 1 is provided. To activate the gate selection element 6 along a shift gate, a gear selection actuating cylinder is provided.

The gate selection actuating cylinder 1 is formed, e.g., as a double-action actuating cylinder with a piston 3 and a piston rod 2. The piston rod 2 is connected with the gear selection element 6. By corresponding application of the pressure medium of the pressure medium chamber to the left or right of piston 3, the piston 3 can be moved in the actuating cylinder 1 either into the left end position 4 or into the right end position 5. In particular, compressed air can be used as the pressure medium.

Figure 2:
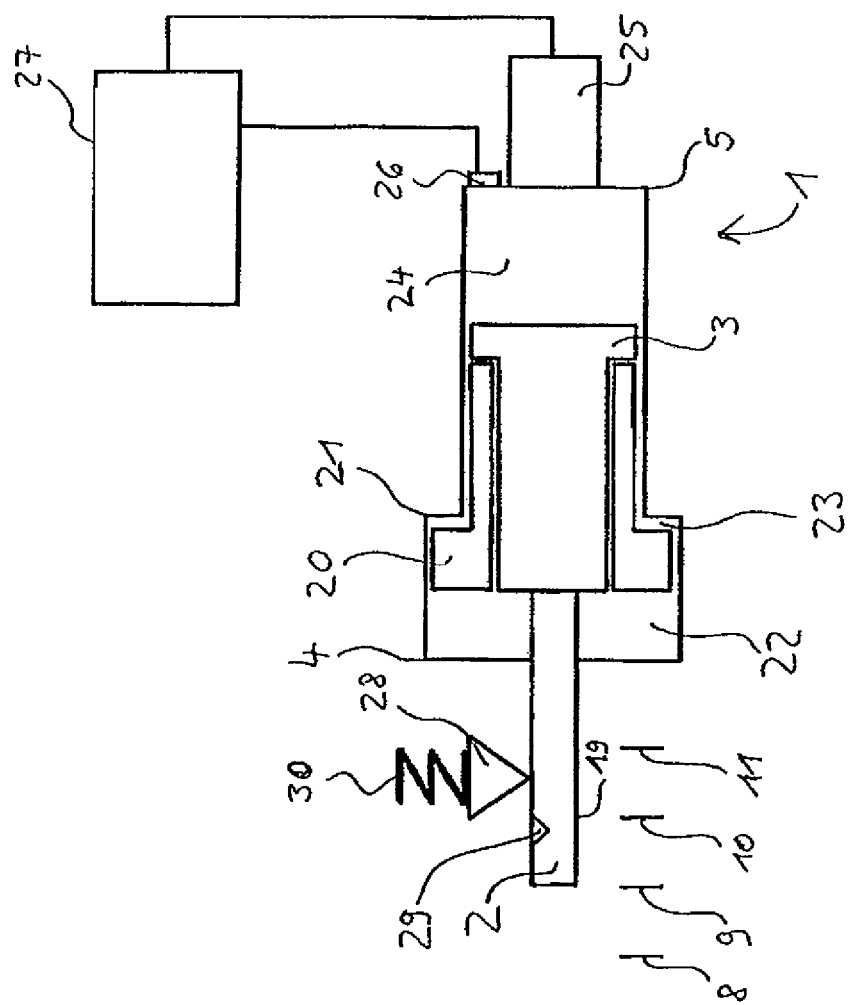
FIG. 2 is a schematic view of a gate selection actuating cylinder with activating elements in accordance with an embodiment of the present invention.

FIG. 2 shows an embodiment of the gate selection actuating cylinder 1 as a three-position cylinder. The gate selection actuating cylinder 1 in this case has a further piston 20 as well as the piston 3 shown in FIG. 1 that is connected with piston rod 2. The piston 3 can be moved in relation to the further piston 20. The gate selection actuating cylinder 1 at position 21 also has a shoulder that serves as a stop for the further piston 20. Between the piston 3, the further piston 20 and the housing of the gate selection actuating cylinder 1 are formed pressure medium chambers 22, 23, 24. By corresponding control of the application of the pressure medium of pressure medium chambers 22, 24, the piston rod 2 can be moved into three positions, namely into the positions corresponding to shift gates 8, 9, 11. To approach the shift gate 8, pressure medium chamber 24 is pressurized. To approach shift gate 9, pressure medium chambers 22 and 24 are pressurized. To approach shift gate 11, only pressure medium chamber 22 is pressurized. The positions corresponding to shift gates 8, 9, 10, 11 are shown in FIG. 2 in relation to the end of the piston rod 2. The pressure medium chamber 23 (middle chamber) is connected with atmospheric pressure and is not pressurized.

In order to also be able to approach shift gate 10, a catch device is provided that has a locking element 28, which is supported via a spring 30 on a housing component or other fixed component of the gearbox actuator. A catch recess is provided on the piston rod 2 that can be formed as a dip 29. When the gate selection actuating cylinder 1 is moved, for example, from shift gate 9 towards shift gate 11, the locking element 28 at a particular time meets the locking recess 29 and engages therein. If the pressure in the pressure medium chamber 22 remains sufficiently high, the piston rod is moved further in the direction towards shift gate 11 and the fixing at the catch position is then overcome again. If the pressure medium chamber 22 is pressurized with a correspondingly short pressure pulse, which is reduced to a sufficiently low level on reaching catch position 19, an automatic fixing in catch position 19 takes place. The level to which the pressure pulse must be reduced on reaching catch position 19 to guarantee fixing is determined by the spring force of the spring 30 and by the respective contouring of the intermeshing surfaces of the locking element 28 and locking recess 29.

The gate selection actuating cylinder 1 is moved from catch position 19 into another shift position by pressurizing the corresponding pressure medium chambers 22, 24. This overcomes the fixing at the catch position.

The gate selection actuating cylinder 1 has an electrically controllable actuating unit 25, which can be implemented, for example, by solenoid valves. Via actuating unit 25, the pressure medium is introduced into pressure medium chambers 22, 24 or dissipated therefrom according to the setting of an electronic control unit 27.

The actuating cylinder 1 also has a distance sensor 26 via which the stroke covered by the piston 3 or piston rod 2 can be detected. The distance sensor 26 can be formed, for example, as an inductive sensor, in particular a PLCD sensor.

The distance sensor 26 and actuating unit 25 are connected via electrical lines with the electronic control device 27. The electronic control device 27 serves to control the gearbox actuator and has a corresponding control program.

Figure 3:
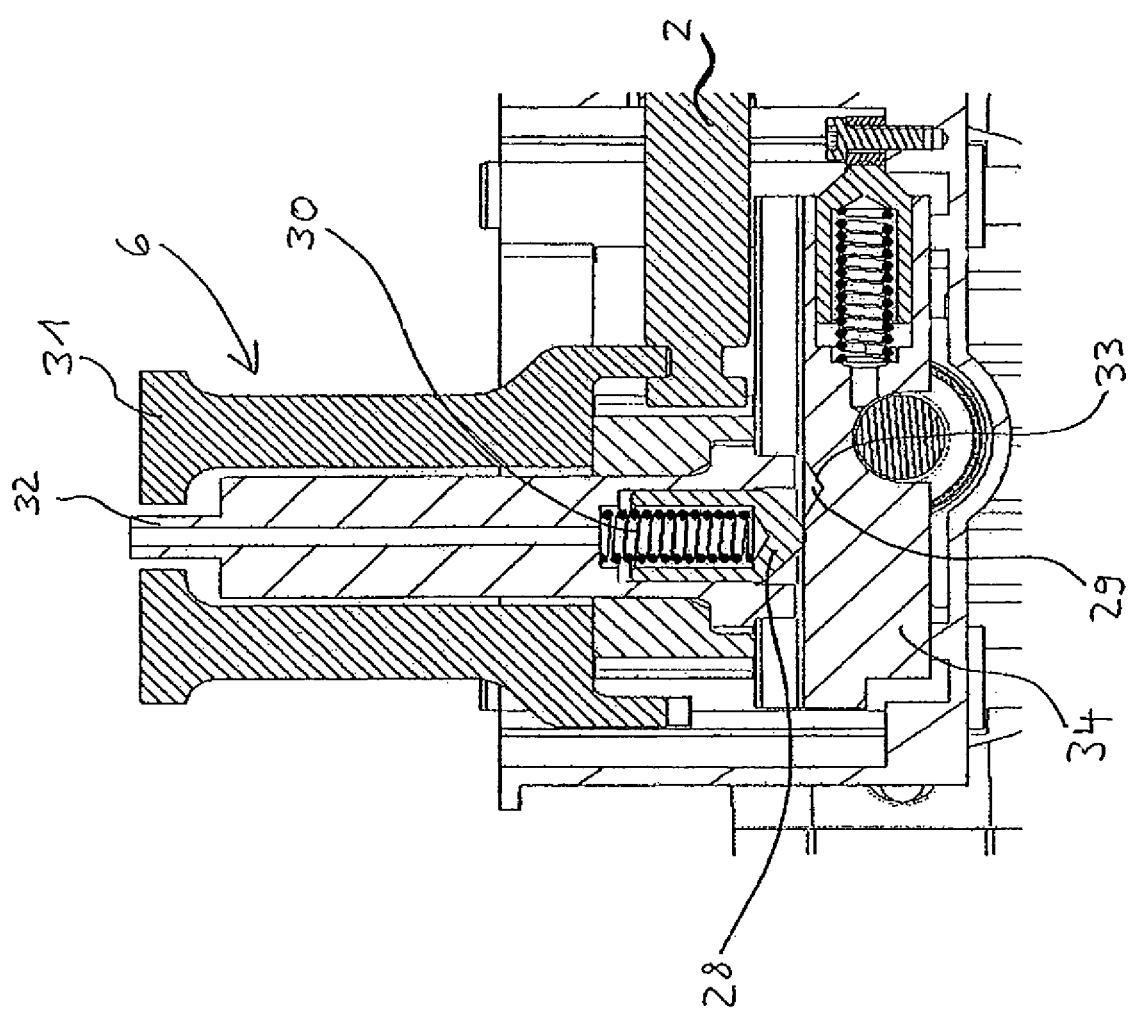
FIG. 3 is a cross-sectional view of a gearbox actuator in accordance with an embodiment of the present invention.

FIG. 3 is a sectional view showing the design elements of the gearbox actuator. The piston rod 2 with which the gear selector element 6 is connected can be seen in FIG. 3. The gear selection element 6 has a blocking piece 31, a shift finger 32, a gate shift piece 35, and a gear shift piece 34. The blocking piece 31 constitutes the connection of the piston rod 2 with the gear selection element 6. The shift finger 32 is arranged inside the blocking piece 31. The gate shift piece 35 is firmly screwed to the blocking piece 31. The gate shift piece 35 serves for gate selection and is therefore movable in the selection gate direction. The gate shift piece 35 simultaneously serves as a guide element for the shift finger 32 in the shift gate direction. The gear shift piece 34 can be shifted in the direction of the shift gates. It serves simultaneously as a guide in the selector gate direction.

The locking element 28 is arranged within the shift finger 32 in the form of a catch bolt with spring 30. The locking recess 29 is arranged in the gear shift piece 34 below the shift finger 32 in the form of a dip. The dip 29 has a peripheral wall 33, which has a predetermined slope. The slope of the wall 33 is matched to the tip of the locking bolt 28 such that, further taking into account the force of the spring 30, catch position 19 can be overcome by pressurization of the actuating cylinder 1.

As evident from the exemplary embodiments shown in FIGS. 2 and 3, various advantageous arrangements of the components of the catch device in the gearbox actuator are provided. FIG. 2 shows an example in which the locking element 28 and spring 30 are firmly arranged at a position fixed in relation to the housing, while the locking recess 29 is arranged on a movable component in relation thereto. FIG. 3 shows an example in which the locking recess 29 is arranged at a position fixed in relation to the housing while the locking element 28 and spring 30 are arranged on a movable component in relation thereto. It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A gearbox actuator for operating a gearbox, comprising a gate selection actuating cylinder for selection of at least one shift gate; a gear selection actuating cylinder for engaging at least one gear in the at least one shift gate; and a catch device configured to releasably fix one of the gate selection actuating cylinder and a component movable by the gate selection actuating cylinder in at least one predetermined catch position that differs from end positions of the gate selection actuating cylinder.

2. A gearbox actuator for operating a gearbox, comprising a gate selection actuating cylinder for selection of at least one shift gate; a gear selection actuating cylinder for engaging at least one gear in the at least one shift gate; and a catch device configured to releasably fix one of the gate selection actuating cylinder and a component movable by the gate selection actuating cylinder in at least one predetermined catch position, wherein the catch device is further configured to release the one of the gate selection actuating cylinder and the component movable by the gate selection actuating cylinder by activation of a pressure medium of the gate selection actuating cylinder.

3. A gearbox actuator for operating a gearbox, comprising a gate selection actuating cylinder for selection of at least one shift gate; a gear selection actuating cylinder for engaging at least one gear in the at least one shift gate; and a catch device configured to releasably fix one of the gate selection actuating cylinder and a component movable by the gate selection actuating cylinder in at least one predetermined catch position, wherein the gate selection actuating cylinder is configured to move a shift finger in a selection gate.

4. A gearbox actuator for operating a gearbox, comprising a gate selection actuating cylinder for selection of at least one shift gate; a gear selection actuating cylinder for engaging at least one gar in the at least one shift gate; and a catch device configured to releasably fix one of the gate selection actuating cylinder and a component movable by the gate selection actuating cylinder in at least one predetermined catch position, wherein the gate selection actuating cylinder is a multi-position cylinder configured to occupy (i) end positions and (ii) at least one predetermined intermediate position approachable by activation of a pressure medium, and wherein the at least one predetermined catch position is different from each of the end positions and the at least one predetermined intermediate position.

5. A gearbox actuator for operating a gearbox, comprising a gate selection actuating cylinder for selection of at least one shift gate; a gear selection actuating cylinder for engaging at least one gear in the at least one shift gate; and a catch device configured to releasably fix one of the gate selection actuating cylinder and a component movable by the gate selection actuating cylinder in at least one predetermined catch position, the catch device having a locking element configured to engage in a locking recess of the one of the gate selection actuating cylinder and the component movable by the gate selection actuating cylinder, the locking element being exposed to a spring force in a direction of the locking recess.

6. The gearbox actuator according to claim 5, wherein the locking recess has at least one sloping side wall.

7. The gearbox actuator according to claim 5, wherein the locking element is integrated in a shift finger.

8. A gearbox actuator for operating a gearbox, comprising a gate selection actuating cylinder for selection of at least one shift gate; a gear selection actuating cylinder for engaging at least one gear in the at least one shift gate; a catch device configured to releasably fix one of the gate selection actuating cylinder and a component movable, by the gate selection actuating cylinder in at least one predetermined catch position, and a distance sensor configured to detect an activation stroke of the gate selection actuating cylinder.

9. A gearbox actuator for operating a gearbox, comprising a gate selection actuating cylinder for selection of at least one shift gate; a gear selection actuating cylinder for engaging at least one gear in the at least one shift gate; a catch device configured to releasably fix one of the gate selection actuating cylinder and a component movable by the gate selection actuating cylinder in at least one predetermined catch position; and a distance sensor configured to detect an activation stroke of the gate selection actuating cylinder, the distance sensor being connected to an electronic control device configured to evaluate a distance signal of the distance sensor, output an activation signal to the gate selection actuating cylinder, and automatically learn the at least one predetermined catch position and an activation time necessary for activating the gate selection actuating cylinder from an end position of the gate selection actuating cylinder to the at least one predetermined catch position.

* * * * *